Figure 1:
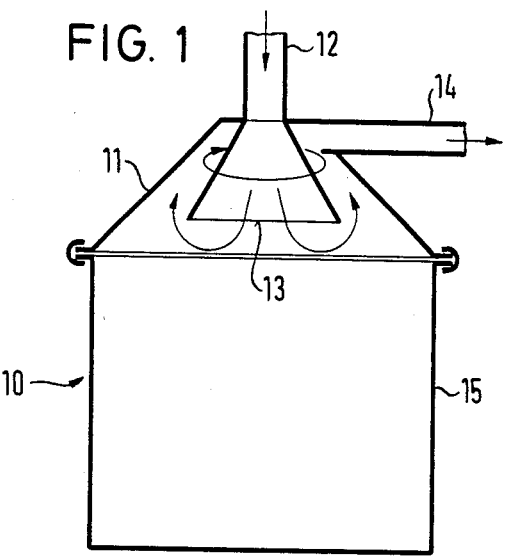

United States Patent [19]

Lotz

[11] Patent Number: 4,749,387
[45] Date of Patent: Jun. 7, 1988

[54] SEPARATOR FOR SOLID PARTICLES ENTRAINED IN A GAS FLOW

[75] Inventor: Helmut Lotz, Giengen, Fed. Rep. of Germany

[73] Assignee: Bosch-Siemens Hausgeräte GmbH, Munich, Fed. Rep. of Germany

[21] Appl. No.: 937,069

[22] Filed: Dec. 2, 1986

[30] Foreign Application Priority Data

Dec. 2, 1985 [DE] Fed. Rep. of Germany ....... 3542555

[51] Int. Cl.4 .............................................. B01D 45/06
[52] U.S. Cl. ........................................ 55/190; 55/195; 55/205; 55/269; 55/319
[58] Field of Search ................... 55/190, 195, 205, 269, 55/319, 394, 395, 418, 421, 463, 465, 164, DIG. 15

[56] References Cited

U.S. PATENT DOCUMENTS 3,009,537 11/1961 Glasgow et al. ........................ 55/164
3,996,027 12/1976 Schnell et al. .......................... 55/36
4,113,454 9/1978 Cvacho ................................... 55/319
4,309,196 1/1982 Vollhardt ......................... 55/269 X
4,363,641 12/1982 Finn ....................................... 55/205
4,555,912 12/1985 Bogosh ........................... 55/269 X

*Primary Examiner*—Charles Hart
*Attorney, Agent, or Firm*—Herbert L. Lerner; Laurence A. Greenberg

[57] ABSTRACT

A separator for solid particles entrained in a gas flow formed of a cold air current discharging from an expansion turbine, the separator having a collection vessel disposed in and perpendicular to the air current and including a dome-type cover disposable above and connectible to the collection vessel, a feed line having a downwardly widening funnel-type end extending into the cover, and an outlet pipe tangentially connected to the cover in an upper region thereof, the funnel-type end of the feed line having an edge disposed at a location lower than that of the outlet pipe.

7 Claims, 1 Drawing Sheet

SEPARATOR FOR SOLID PARTICLES ENTRAINED IN A GAS FLOW

The invention relates to a separator for solid particles entrained in a gas flow and, more particularly, a separator for frost or ice crystals or both thereof in a cold air current discharging from an expansion tube, the separator having a collection vessel disposed in and extending perpendicularly to the air current.

It has become known heretofore to employ a cyclone separator for separating solid particles entrained in a gas flow, the solid particles being deposited in a collection vessel at the bottom of the cyclone separator. To the extent that the entrained solid particles are concerned with substances which tend to adhere or become lumped together, it has been found that they deposit at the wall of the conventional cyclone separators and, as the accumulation thereof increases, impair the operation of the cyclone separators.

This dangerous situation materializes especially if frost or ice crystals or both thereof formed in the cold air current downstream of an expansion turbine are the solid particles which are involved. They tend to form a steadily growing ice shield or layer on the wall of the cyclone separator which, after a relatively brief operating duration, causes impairment of the functions of the cyclone separator. This is the case especially if the expansion turbine is being operated intermittently, and the temperature of the cyclone separator increases beyond i.e. above the freezing point due to heat absorption from the outside in the intermittent periods during which the cyclone separator is not in operation.

It is accordingly an object of the invention to provide such a cyclone separator which meets the particular requirements or conditions for separating frost or ice crystals or both thereof from a cold air current discharging from an expansion turbine downstream therefrom while avoiding the occurrence of the hereinaforementioned disadvantages of and dangers to the operation of the cyclone separator.

With the foregoing and other objects in view, there is provided, in accordance with the invention, a separator for solid particles entrained in a gas flow formed of a cold air current discharging from an expansion turbine, the separator having a collection vessel disposed in and perpendicular to the air current comprising a dome-type cover disposable above and connectible to the collection vessel, a feed line having a downwardly widening funnel-type end extending into the cover, and an outlet pipe tangentially connected to the cover in an upper region thereof, the funnel-type end of the feed line having an edge disposed at a location lower than that of the outlet pipe.

With the arrangement according to the invention and the resulting delayed sharp deflection of the air, it is possible to keep as small as possible force components acting upon the entrained solid particles and directed against the wall of the cyclone separator as the solid particles enter the cyclone separator, and thereby force a reliable separation of the solid particles on the bottom of the collection vessel. In a more specific embodiment of the invention, the solid particles are frost or ice crystals or both thereof.

In accordance with another feature of the invention, the cover is formed of a cone-shaped shell having an inclination with respect to the horizontal which is less than the inclination of the downwardly widening funnel-type end of the feed line.

In accordance with a further feature of the invention, the downwardly widening funnel-type end of the feed line is coaxial with the cone-shaped shell of the cover.

Due to the thus narrowing flow cross section to the tangential connection of the outlet pipe in the upper region of the cover, a circular force component is superimposed on the upward flow of air which increases the length of the separating path and, accordingly, promotes an effective separation.

In accordance with an an additional feature of the invention, the cover has a lower edge, and the edge of the downwardly widening funnel-type end of the feed line extends nearly to the level of the lower edge of the cover.

An especially sharp reduction in velocity thereby occurs which, together with the sharp air deflection around the lower edge of the cone-shaped widened or flaring feed line, produces an especially effective or efficient separation.

In accordance with an added feature of the invention, the cover is removably connected to the collection vessel through the intermediary of an element formed of a material having relatively poor heat conductivity.

The intermediate connection of the aforementioned element formed of material having poor heat conductivity permits a sweeping automation when frost or ice crystals accumulating on the bottom are thawed or defrosted, without any occurrence of undesired thermal reactions on the cover.

In accordance with yet another feature of the invention, the solid particles entrained in the cold air current are formed of frost or ice crystals or both thereof, and the collection vessel contains heating elements and is formed with a valve-controlled discharge for thawed water formed by heating the crystals with the heating elements. This results in the fully automatic removal of the separated frost and ice, respectively.

In accordance with a concomitant feature of the invention, the collection vessel has sensors for detecting the extent to which the collection vessel is filled.

Other features which are considered as characteristic for the invention are set forth in the appended claims.

Although the invention is illustrated and described herein as embodied in a separator for solid particles entrained in a gas flow, it is nevertheless not intended to be limited to the details shown, since various modifications and structural changes may be made therein without departing from the spirit of the invention and within the scope and range of equivalents of the claims.

Figure 2:
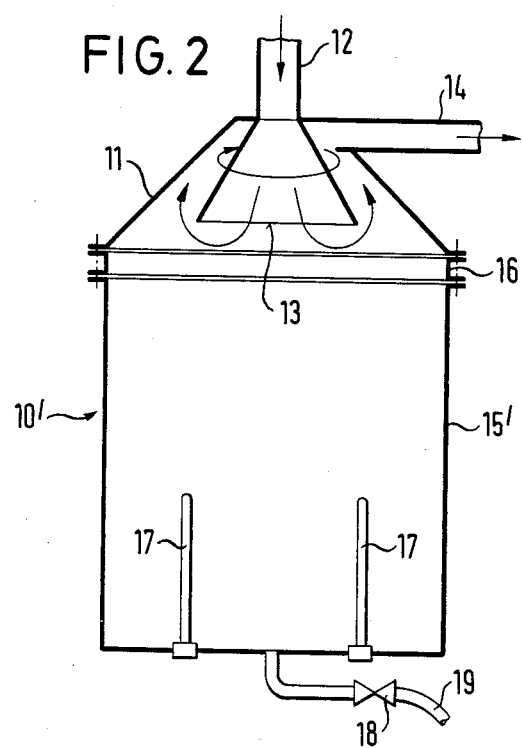

The construction and method of operation of the invention, however, together with additional objects and advantages thereof will be best understood from the following description of specific embodiments when read in connection with the accompanying drawings, in which:

FIG. 1 is a diagrammatic elevational view of a cyclone separator having a cover with a feed line having a funnel-shaped end widening into the cover from above, and a removable collection vessel disposed below the cover; and FIG. 2 is a view similar to that of FIG. 1 of another embodiment of the cyclone separator having heating elements arranged in the collection vessel thereof and a valve-controlled discharge for melted snow and ice connected to the collection vessel at the bottom thereof.

Referring now to both figures of the drawing, there is shown therein a respective embodiment of a cyclone separator 10, 10' having a respective cover 11 into which a respective feed line 12 widening funnel-like downwardly is inserted. The funnel-shaped widened-out feed line 12 has an edge 13 at the lower opening thereof, as viewed in the figures, which is located below an outlet pipe 14 connected tangentially to the cover 11 at an upper region of the latter. The cover 11, in the illustrated embodiments, is in the form of a cone-shaped shell which has an inclination with respect to the horizontal which is smaller than the corresponding inclination of the funnel-shaped widened end of the feed line 12 inserted into the respective cyclone separator 10, 10' coaxially therewith. The lower end of the feed line 12 defined by the edge 13 extends at least approximately to the level of an edge of the cover 11 underlying the edge 13 of the widened end of the feed line 12.

The cover 10, 10' is removably seated in the aforedescribed manner on a collection vessel 15, 15' which, in the embodiment of FIG. 1, is constructed as a simple cylinder having a closed bottom.

In the embodiment according to FIG. 2, the collection vessel 14' differs from the collection vessel 15 of FIG. 1 in that it is removably connected to the cover 11 through the intermediary of a ring-shaped element 16 formed of a poorly heat-conductive material. In this case, the collection vessel 15' is provided on the bottom thereof with heating elements 17 and a discharge 19 for melted snow and ice which is controlled by a valve 18.

The aforedescribed and illustrated separators operate in the manner described hereinafter:

Cold air leaving a non-illustrated expansion turbine is introduced together with frost and ice crystals, respectively, which are formed during the expansion phase in the turbine vertically from above through the feed line 12 into the respective separator 10 and 10'. The velocity of the air is reduced by the funnel-shaped flaring or widened end of the feed line 12, and the air flow is then reversed by 180° in upward direction. To an extent determined by inertial or mass forces and gravitational forces, the frost crystals are separated. They drop downwardly into the vessel 15, 15'. Due to the suction applied tangentially through the outlet pipe 14 introduced into the upper part of the cover 11, a circular or rotational component is imposed on the upward air flow, thereby increasing the length of the separation path.

The vessel 15 is made so large that it can contain a quantity of frost which would accumulate therein over a great period of time. With the embodiment of FIG. 1, the frost can be thawed out or defrosted manually by removing the collection vessel 15 from the cover 11, after the expansion turbine has been shut off and after respective fastening means of the collection vessel 15 have been loosened, and the frost accumulated therein or, if necessary or desirable, also the thawed water or dew resulting from the application of heat thereto, is poured out.

A simple means for detecting the necessity for introducing a thawing or defrosting process is observation or monitoring of the quantity of frost or frozen fog. The collection vessel 15 is formed, for this purpose, out of transparent material. Also, sensors can be arranged, however, in the interior of the collection vessel 15 for signalling the extent to which the collection vessel is filled and, accordingly, the necessity for emptying the vessel.

In the embodiment of FIG. 2 also, depending upon the inertial or mass and gravity forces, the frost and ice crystals are separated from the air flow by reducing the flow velocity and by delayed sharp deflection of the flow direction also, in this embodiment, a circular flow component is superimposed upon the upward air movement due to the suction applied in tangential direction through the outlet pipe 14 extending into the upper region of the cover 11, the circular flow component thereby increasing the length of the separation path and making the separation more effective. In this case also, the collection vessel 15' is formed of such size as to be able to accommodate i. e. collect, a quantity of frost or frozen fog over a relatively long period of time. The thawing or defrosting then occurs in intervals following the switching-off of the expansion turbine and the switching-on of the heating elements 17. The thawed water or dew is then drained off via the discharge pipe 19 controlled by the valve 18.

A relatively simple means for introducing the thawing or defrosting process, for example by actuating an electric switch, is monitoring or observing the separated quantity of frost or frozen fog through a vessel formed, in this case, of transparent material. However, sensors can also be arranged, in this case, within the collection vessel 15' and can release or initiate the process of switching on the heating elements 17 when a given quantity of frost or frozen fog has accumulated in the collection vessel 15'. Following the foregoing, the expansion turbine can be switched on either at random or in a time-controlled manner by temperature sensors located on or in the outlet pipe 14. Moreover, it is also possible to effect a purely time-controlled introduction of the thawing or defrosting process and termination thereof.

The foregoing is a description corresponding in substance to German application No. P 35 42 555.5, dated Dec. 2, 1985, the International priority of which is being claimed for the instant application, and which is hereby made part of this application. Any material discrepancies between the foregoing specification and the aforementioned corresponding German application are to be resolved in favor of the latter.

I claim:

1. Separator for frost or ice crystals entrained in a gas flow formed of a cold air current discharging from an expansion turbine., the separator having a collection vessel disposed in and perpendicular to the air current comprising a dome-type cover open at the bottom thereof, and disposable above and connectible to the collection vessel, a feed line having a downwardly widening funnel-type end extending into said cover, and an outlet pipe tangentially connected to said cover in an upper region therof, said funnel-type end of said feed line having an edge disposed at a location lower than that of said outlet pipe.

2. Separator according to claim 1, wherein said cover is formed of a cone-shaped shell having an inclination with respect to the horizontal which is less than the inclination of the downwardly widening funnel-type end of said feed line.

3. Separator according to claim 1, wherein said downwardly widening funnel-type end of said feed line is coaxial with said cone-shaped shell of said cover.

4. Separator according to claim 1, wherein said cover has a lower edge, and said edge of said downwardly widening funnel-type end of said feed line extends nearly to the level of said lower edge of said cover.

5. Separator according to claim 1 wherein said cover is removably connected to said collection vessel through the intermediary of an element formed of a material having relatively poor heat conductivity.

6. Separator according to claim 1 wherein said collection vessel contains heating elements and is formed with a valve-controlled discharge for thawed water formed by heating the crystals with said heating elements.

7. Separator according to claim 1 wherein said collection vessel has sensors for detecting the extent to which said collection vessel is filled.

* * * * *